United States Patent
Choi

(10) Patent No.: US 11,140,994 B2
(45) Date of Patent: Oct. 12, 2021

(54) BED FRAME

(71) Applicant: Inno-Sports Co., Ltd, Xiamen (CN)

(72) Inventor: Kwan Jun Choi, Xiamen (CN)

(73) Assignee: Inno-Sports Co., Ltd, Xiamen (CN)

( * ) Notice: Subject to any disclaimer, the term of this patent is extended or adjusted under 35 U.S.C. 154(b) by 0 days.

(21) Appl. No.: 15/931,663

(22) Filed: May 14, 2020

(65) Prior Publication Data
US 2020/0359803 A1   Nov. 19, 2020

(30) Foreign Application Priority Data
May 14, 2019  (CN) .................. 201920685014.X

(51) Int. Cl.
*A47C 19/04*   (2006.01)
*F16B 12/54*   (2006.01)

(52) U.S. Cl.
CPC .............. *A47C 19/04* (2013.01); *F16B 12/54* (2013.01)

(58) Field of Classification Search
CPC .................................. A47C 19/04; F16B 12/54
See application file for complete search history.

(56) References Cited

U.S. PATENT DOCUMENTS 4,679,261 A * 7/1987 Stanley .................. A47C 19/04
403/104

\* cited by examiner

*Primary Examiner* — Fredrick C Conley
(74) *Attorney, Agent, or Firm* — Bayramoglu Law Offices LLC

(57) ABSTRACT

A bed frame includes two first supports located on two sides of the bed frame, wherein a second support is provided between the two first supports, two ends of the second support are coupled to the two first supports, the first support includes a first rod member and a second rod member that are relatively movable, and the second rod member is sleeved on the outer periphery of the first rod member; and the second support includes a third rod member and a fourth rod member that are relatively movable, and the fourth rod member is sleeved on the outer periphery of the third rod member. The length and width of the bed frame can be adjusted, so that the bed frame can be adapted to mattresses of various sizes and specifications.

18 Claims, 5 Drawing Sheets

BED FRAME

CROSS REFERENCE TO THE RELATED APPLICATIONS

This application is based upon and claims priority to Chinese Patent Application No. CN 201920685014.X, filed on May 14, 2019, the entire contents of which are incorporated herein by reference.

TECHNICAL FIELD

The present invention relates to a bed frame.

BACKGROUND

Beds are widely used in bedrooms, dormitories, wards, hotels and other places, and refer to a piece of furniture that provides a place for sleep and is generally made of wood, stainless steel and other metals, including headboards, tailboards, bed legs, bed boards, bed mattresses, left and right folding guards, mute casters, integrated dining tables, commodity shelves, which are fabricated by punching, assembly, welding, riveting, derusting, plastic spraying and other processes. Beds are appliances for sleeping and daily living of human beings.

However, in our daily life, most of the beds have a fixed size. The folding bed used in our bedroom or office has a fixed and unchangeable length and width, which will cause many inconveniences in use. Nowadays, in the market of beds, one mattress with a size corresponding to the size of the bed frame is matched with one bed. In this way, in the production process, it is necessary to manufacture a variety of bed frames to match the mattresses of different specifications. For example, there are commonly used beds with the widths of 1.5 m and 1.8 m in our daily life, whereas there are beds of other specifications and sizes such as the 1.2 m wide single beds having different lengths used in the hotels. The existing mattresses of different specifications can only be matched with the bed frames of corresponding specifications, which cannot be uniformly matched.

SUMMARY

In order to solve the above technical problems, an objective of the present invention is to provide a bed frame.

The present invention is realized by the following technical solution:

A bed frame, including first supports located on two sides of the bed frame, wherein a second support is provided between two first supports, and two ends of the second support are coupled with the two first supports; the first support includes a first rod member and a second rod member that are relatively movable, and the second rod member is sleeved on the outer periphery of the first rod member; and the second support includes a third rod member and a fourth rod member that are relatively movable, and the fourth rod member is sleeved on the outer periphery of the third rod member.

In an embodiment of the present invention, the first support includes a first rod member, and the outer peripheries of two ends of the first rod member are each sleeved with a second rod member.

In an embodiment of the present invention, two ends of the first rod member are each provided with a first opening penetrating through the first rod member from outside to inside; a first protruding pin is provided in the first opening; one end of the first protruding pin can protrude outside the first rod member, and the other end of the first protruding pin is coupled with an elastic sheet located in the first rod member; and at least two second openings penetrating through the second rod member from outside to inside are provided on the second rod member, and one end of the first protruding pin is configured to be inserted into the second opening.

In an embodiment of the present invention, lower ends of middle portions of the first rod member and the two second rod members are each provided with a first supporting leg.

In an embodiment of the present invention, the second support includes two fourth rod members arranged side by side and coupled to each other, wherein one end of one fourth rod member is inserted with one third rod member, and the other end of the other fourth rod member is inserted with another third rod member.

In an embodiment of the present invention, one end of the third rod member inserted into the fourth rod member is provided with a third opening penetrating through the third rod member; a second protruding pin is provided in the third opening; one end of the second protruding pin can extend outside the third rod member, and the other end of the second protruding pin is coupled with an elastic sheet located in the third rod member; and at least two fourth openings penetrating through the fourth rod member from outside to inside are provided on the fourth rod member, and one end of the second protruding pin is configured to be inserted into the fourth opening.

In an embodiment of the present invention, the other end of one fourth rod member and one end of another fourth rod member are provided with connecting members, and an opening sleeved outside the third rod member is provided on the connecting member.

In an embodiment of the present invention, a second supporting leg is provided below the fourth rod member.

In an embodiment of the present invention, a slot is provided on a side wall of the first support facing toward the inside of the bed frame, and two ends of the second support are provided with insertion sheets that can be matched with the slot.

In an embodiment of the present invention, one end of the first support is coupled with a vertical headboard iron sheet, and a connecting hole is provided on the headboard iron sheet.

The bed frame of the present invention has the following advantages: the sizes of two supports in the length and width directions of the bed frame are adjustable, so as to form bed frames of different sizes and specifications, which matches mattresses of different specifications. In this way, a bed frame can be adapted to mattresses of all specifications, realizing uniform matching.

BRIEF DESCRIPTION OF THE DRAWINGS

In order to more clearly illustrate the technical solutions of the present invention, the drawings in the description of the embodiments or the prior art will be briefly described below. Obviously, the drawings in the following description are only some embodiments of the present invention, and other drawings can be obtained by those of ordinary skill in the art from these without any creative efforts.

DETAILED DESCRIPTION OF THE EMBODIMENTS

Figure 1:
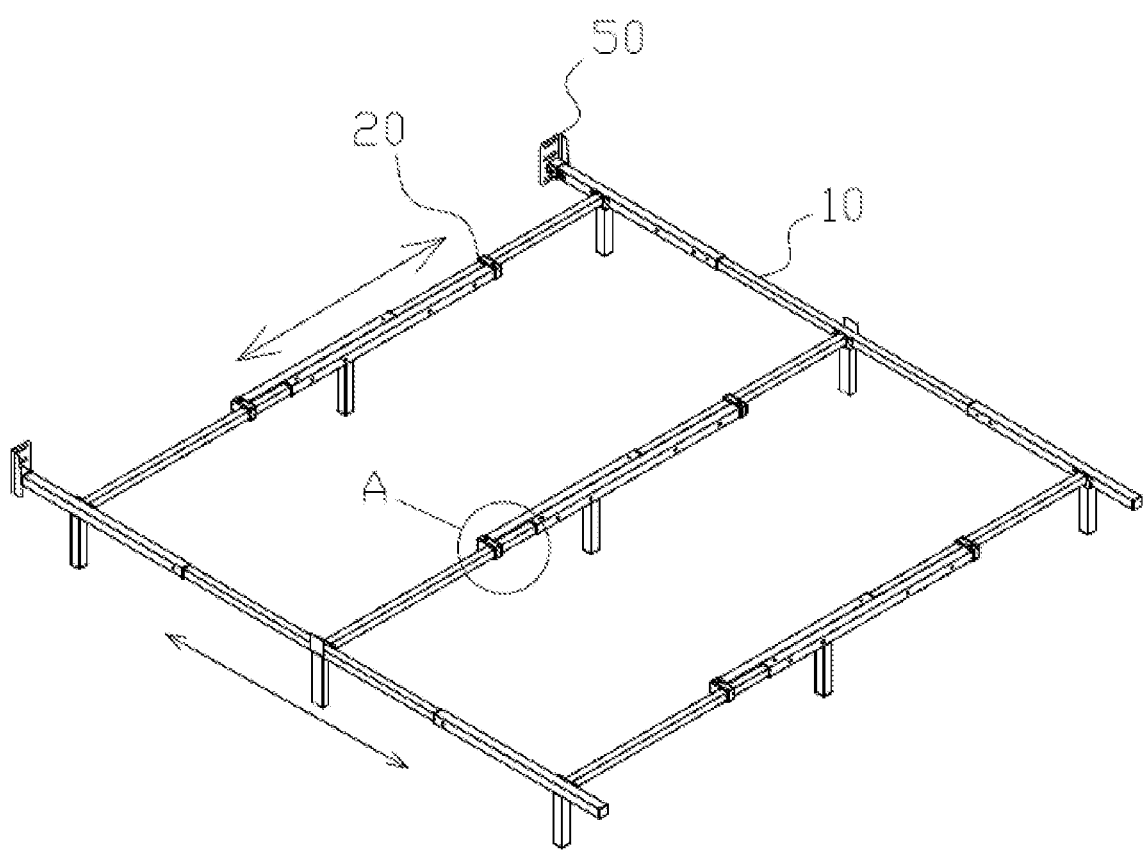
FIG. 1 is a schematic diagram showing a first state of the present invention.
Figure 2:
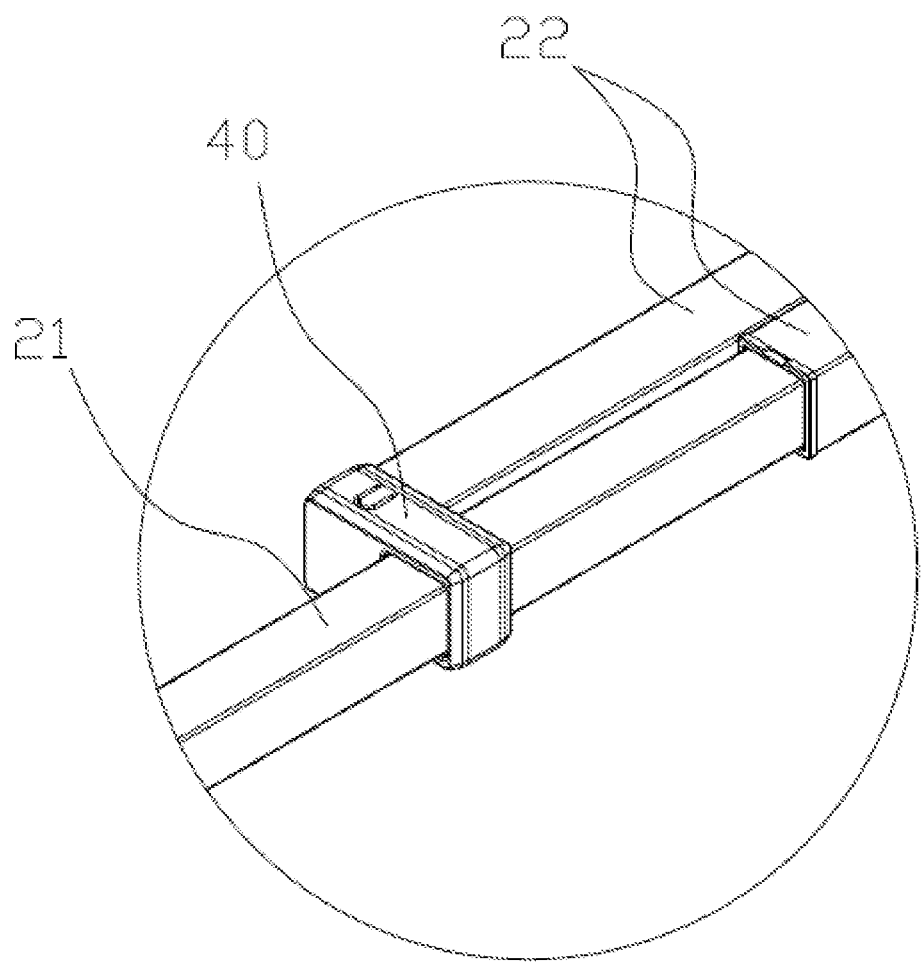
FIG. 2 is an enlarged view showing the area A in FIG. 1.
Figure 3:
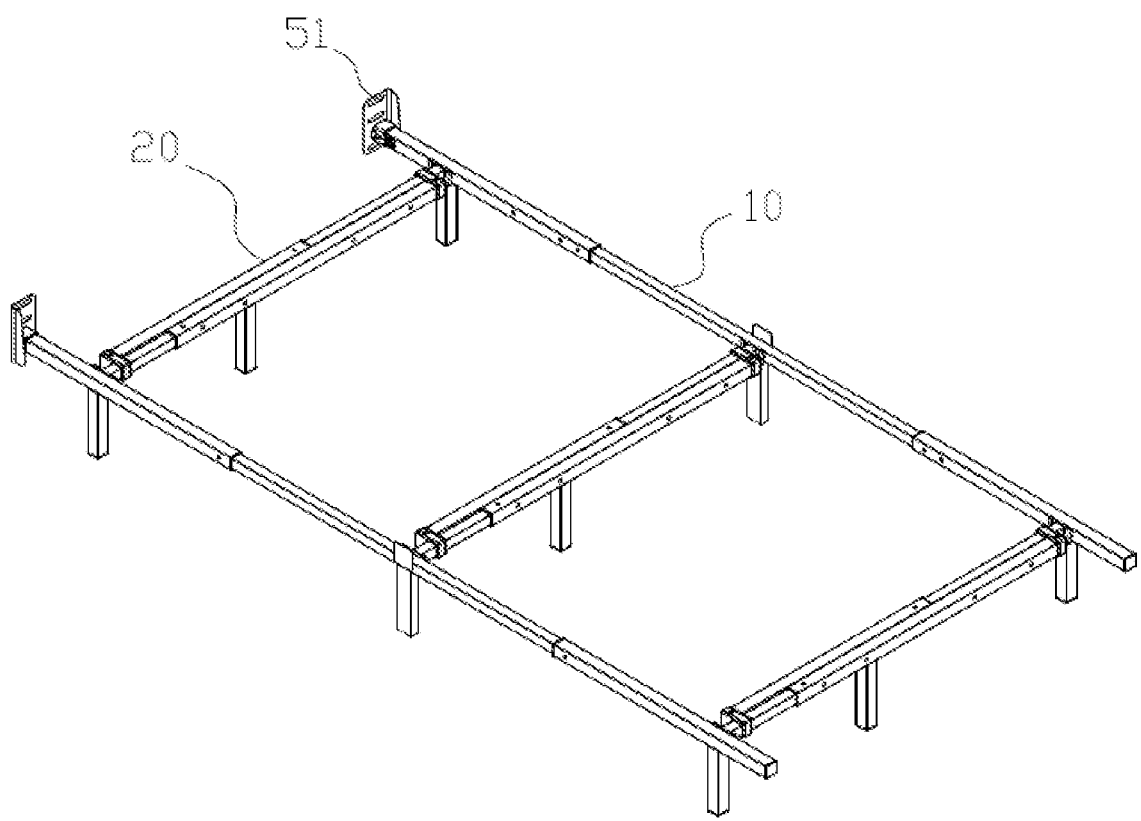
FIG. 3 is a schematic diagram showing a second state of the present invention.
Figure 4:
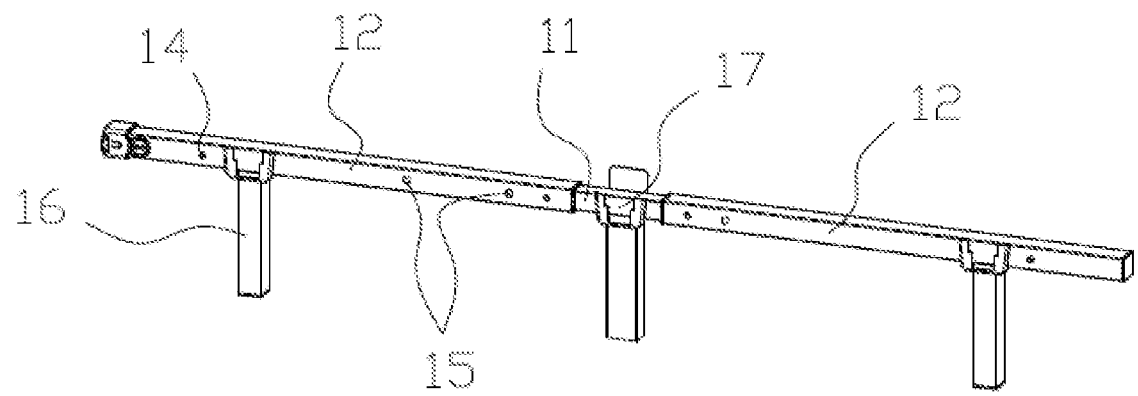
FIG. 4 is a schematic diagram of a first support in the present invention.
Figure 5:
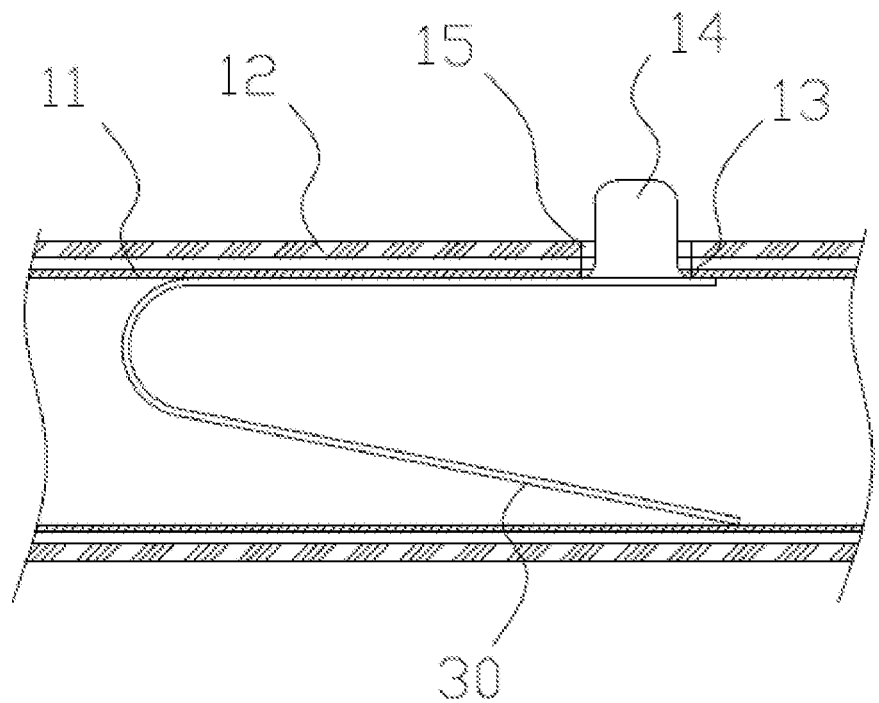
FIG. 5 is a schematic diagram showing the matching of a first protruding pin in the present invention.
Figure 6:
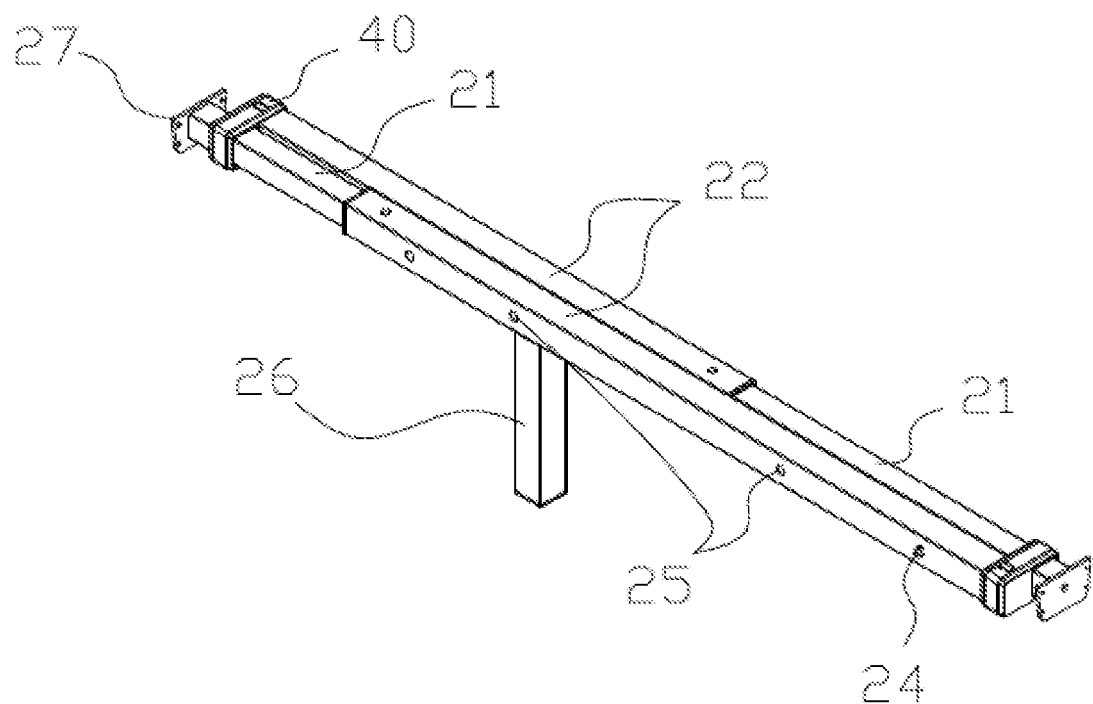
FIG. 6 is a schematic diagram of a second support in the present invention.
Figure 7:
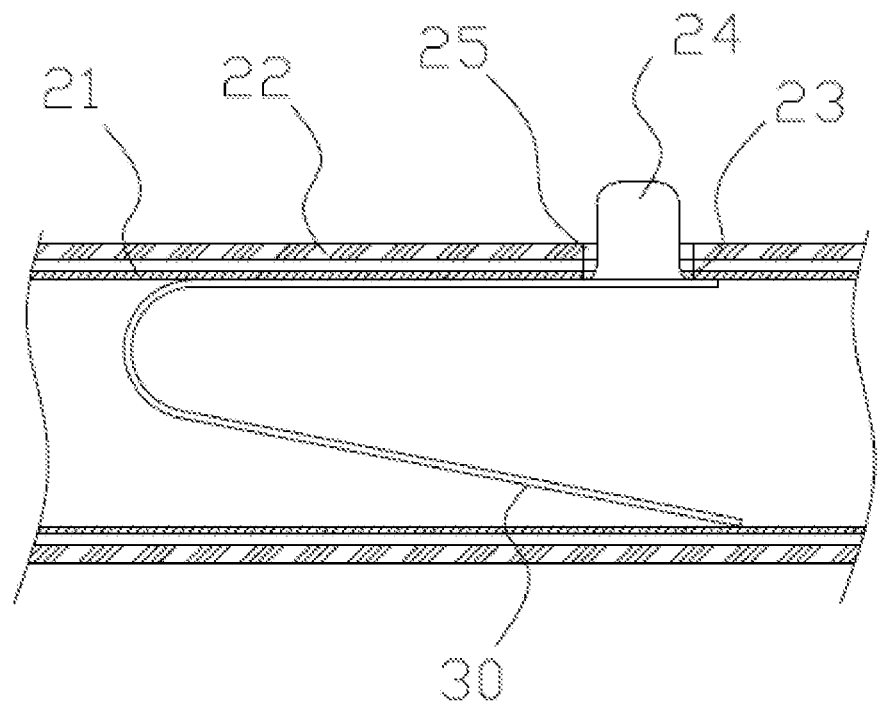
FIG. 7 is a schematic diagram showing the matching of a second protruding pin in the present invention.

The technical solutions in the embodiments of the present invention will be clearly and completely described hereinafter in conjunction with the drawings in the embodiments of the invention. Obviously, the described embodiments are only a part of the embodiments of the present invention rather than all the embodiments. All other embodiments obtained by those of ordinary skill in the art based on the embodiments in the present invention without creative efforts are within the scope of the present invention.

With reference to the drawings of the description, a bed frame includes the first supports 10 located on two sides of the bed frame, the second support 20 is provided between two first supports, and two ends of the second support are coupled to the two first supports. The first support includes the first rod member 11 and the second rod member 12 that are relatively movable, and the second rod member is sleeved on the outer periphery of the first rod member. The second support includes the third rod member 21 and the fourth rod member 22 that is relatively movable, and the fourth rod member is sleeved on the outer periphery of the third rod member. In the present invention, the first support and the second support are retractable, and the size of the bed frame can be adjusted by means of changing the positional relationship of the first rod member and the second rod member, and the positional relationship of the third rod member and the fourth rod member.

In the present invention, the first support includes the first rod member, and the outer peripheries of two ends of the first rod member are each sleeved with the second rod member. Two ends of the first rod member are each provided with the first opening 13 penetrating through the first rod member from outside to inside. The first protruding pin 14 is provided in the first opening. One end of the first protruding pin can extend outside the first rod member, and the other end of the first protruding pin is coupled with the elastic sheet 30 located in the first rod member. In an embodiment, the other end of the first protruding pin is located in the first rod member, and can be matched with an inner peripheral wall of the first rod member through the elastic sheet, so that the other end of the first protruding pin is maintained in the first rod member. The elastic sheet may be a bent metal sheet. With reference to the drawings of the description, at least two second openings 15 penetrating through the second rod member from outside to inside are provided on the second rod member, and one end of the first protruding pin can be inserted into the second opening. When the size of the first support needs to be adjusted, one end of the first protruding pin is pressed, and then the positional relationship between the first rod member and the second rod member is adjusted until the first opening corresponds to one of the second openings. At this time, the first protruding pin extends to the second opening under the action of the elastic sheet. In this way, the positional relationship between the first rod member and the second rod member is fixed. Further, in order to ensure the stability of the bed frame, the lower ends of the middle portions of the first rod member and the two second rod members are each provided with the first supporting leg 16.

In an embodiment of the present invention, the second support includes two fourth rod members 22 arranged side by side and coupled to each other, wherein one end of one fourth rod member is inserted with one third rod member 21, and the other end of the other fourth rod member is inserted with another third rod member. With reference to the drawings of the description, the extension direction and retraction direction of the two third rod members are opposite. One end of the third rod member inserted into the fourth rod member is provided with the third opening 23 penetrating through the third rod member. The second protruding pin 24 is provided in the second opening. One end of the second protruding pin can extend outside the third rod member, and the other end of the second protruding pin is coupled with the elastic sheet 30 located in the third rod member. In an embodiment, the other end of the second protruding pin is located in the third rod member, and can be matched with an inner peripheral wall of the third rod member through the elastic sheet, so that the other end of the second protruding pin is maintained in the third rod member. The elastic sheet may be a bent metal sheet. With reference to the drawings of the description, at least two fourth openings 25 penetrating through the fourth rod member from outside to inside are provided on the fourth rod member, and one end of the second protruding pin can be inserted into the fourth opening. In order to ensure the balance of the movement of the two third rod members, the other end of one fourth rod member and one end of another fourth rod member are provided with the connecting members 40, and an opening (not shown in the drawings) sleeved outside the third rod member is provided on the connecting member. Further, in order to ensure the stability of the bed frame, the second supporting leg 26 is provided below the fourth rod member. When the size of the second support needs to be adjusted, one end of the second protruding pin is pressed. At this time, the second protruding pin releases the fixed positional relationship between the third rod member and the fourth rod member, and the positional relationship between the third rod member and the fourth rod member can be adjusted until the third opening corresponds to one of the fourth openings. At this time, the second protruding pin extends into the fourth opening under the action of the elastic sheet, so that the second protruding pin is engaged in the third opening and the fourth opening, and the third rod member and the fourth rod member cannot be moved. In this way, the positional relationship between the third rod member and the fourth rod member is fixed. The method of changing the sizes and specifications of the first support and the second support are substantially consistent.

In a preferred embodiment of the present invention, the slot 17 is provided on a side wall of the first support facing toward the inside of the bed frame, and two ends of the second support are provided with the insertion sheets 27 that can be matched with the slot. Moreover, the insertion sheet may be of a trapezoidal shape, namely, wide at the top and narrow at the bottom. One end of the first support is coupled with the vertical headboard iron sheet 50, and the connecting hole 51 is provided on the headboard iron sheet. The headboard iron sheet can be used for coupling with a bed backrest.

The above description shows and describes the preferred embodiments of the present invention. As described previously, it should be understood that the present invention is not limited to the form disclosed herein. It should not be considered as an exclusion from other embodiments, and can be used for various other combinations, modifications, and environments. Moreover, it can be modified through the above teachings or techniques or knowledge in related fields within the scope of the concept of the invention described herein. Also, the modifications and changes made by those skilled in the art without departing from the spirit and scope of the present invention should fall within the protection scope of the appended claims of the present invention.

What is claimed is:

1. A bed frame, comprising two first supports located on two sides of the bed frame, wherein a second support is provided between two first supports, and two ends of the second support are coupled to the two first supports, each first support of the two first support comprises a first rod member and a second rod member, the first rod member and the second rod member are relatively movable, and the second rod member is sleeved on an outer periphery of the first rod member; and the second support comprises a third rod member and a fourth rod member that are relatively movable, and the fourth rod member is sleeved on an outer periphery of the third rod member, wherein the each first support comprises one first rod member and two second rod members, and the two second rod member sleeve on outer peripheries of two ends of the first rod member.

2. The bed frame according to claim 1, wherein the two ends of the first rod member are each provided with a first opening penetrating through the first rod member from outside to inside; a first protruding pin is provided in the first opening; a first end of the first protruding pin is configured to extend outside the first rod member, and a second end of the first protruding pin is coupled with an elastic sheet located in the first rod member; and at least two second openings penetrating through the second rod member from outside to inside are provided on the second rod member, and the first of the first protruding pin is configured to be inserted into one second opening of the at least two second openings.

3. The bed frame according to claim 2, wherein lower ends of middle portions of the first rod member and the two second rod members are each provided with a first supporting leg.

4. The bed frame according to claim 3, wherein the second support comprises a fourth rod member I and a fourth rod member II; the fourth rod member I and the fourth rod member II are arranged side by side and coupled to each other, a first end of the fourth rod member I is inserted with a third rod member I, and a second end of the fourth rod member II is inserted with a third rod member II.

5. The bed frame according to claim 3, wherein a slot is provided on a side wall of the first support, the side wall faces toward an inside of the bed frame, two ends of the second support are provided with insertion sheets, and the insertion sheets are matched with the slot.

6. The bed frame according to claim 2, wherein a first end of the third rod member inserted into the fourth rod member is provided with a third opening penetrating through the third rod member; a second protruding pin is provided in the third opening; a first end of the second protruding pin is configured to extend outside the third rod member, and a second end of the second protruding pin is coupled with an elastic sheet located in the third rod member; and at least two fourth openings penetrating through the fourth rod member from outside to inside are provided on the fourth rod member, and the first end of the second protruding pin is configured to be inserted into one fourth opening of the at least two fourth openings.

7. The bed frame according to claim 6, wherein a second end of a fourth rod member I and a first end of a fourth rod member II are provided with a connecting member, and an opening sleeved outside the third rod member is provided on the connecting member.

8. The bed frame according to claim 7, wherein a second supporting leg is provided below the fourth rod member I or the fourth rod member II.

9. The bed frame according to claim 8, wherein a slot is provided on a side wall of the first support, the side wall faces toward an inside of the bed frame, two ends of the second support are provided with insertion sheets, and the insertion sheets are matched with the slot.

10. The bed frame according to claim 7, wherein a slot is provided on a side wall of the first support, the side wall faces toward an inside of the bed frame, two ends of the second support are provided with insertion sheets, and the insertion sheets are matched with the slot.

11. The bed frame according to claim 6, wherein a slot is provided on a side wall of the first support, the side wall faces toward an inside of the bed frame, two ends of the second support are provided with insertion sheets, and the insertion sheets are matched with the slot.

12. The bed frame according to claim 2, wherein the second support comprises a fourth rod member I and a fourth rod member II; the fourth rod member I and the fourth rod member II are arranged side by side and coupled to each other, a first end of the fourth rod member I is inserted with a third rod member I, and a second end of the fourth rod member II is inserted with a third rod member II.

13. The bed frame according to claim 2, wherein a slot is provided on a side wall of the first support, the side wall faces toward an inside of the bed frame, two ends of the second support are provided with insertion sheets, and the insertion sheets are matched with the slot.

14. The bed frame according to claim 1, wherein a slot is provided on a side wall of the first support, the side wall faces toward an inside of the bed frame, two ends of the second support are provided with insertion sheets, and the insertion sheets are matched with the slot.

15. The bed frame according to claim 1, wherein the second support comprises a fourth rod member I and a fourth rod member II; the fourth rod member I and the fourth rod member II are arranged side by side and coupled to each other, a first end of the fourth rod member I is inserted with a third rod member I, and a second end of the fourth rod member II is inserted with a third rod member II.

16. The bed frame according to claim 1, wherein a slot is provided on a side wall of the each first support, the side wall faces toward an inside of the bed frame, two ends of the second support are provided with insertion sheets, and the insertion sheets are matched with the slot.

17. The bed frame according to claim 16, wherein one end of the each first support is coupled with a vertical headboard iron sheet, and a connecting hole is provided on the headboard iron sheet.

18. The bed frame according to claim 1, wherein the second support comprises a fourth rod member I and a fourth rod member II; the fourth rod member I and the fourth rod member II are arranged side by side and coupled to each other, a first end of the fourth rod member I is inserted with a third rod member I, and a second end of the fourth rod member II is inserted with a third rod member II.

* * * * *